US010942066B2

(12) United States Patent
Allen, Sr.

(10) Patent No.: US 10,942,066 B2
(45) Date of Patent: *Mar. 9, 2021

(54) TEMPERATURE MONITORING SYSTEMS AND METHODS

(71) Applicant: Weber-Stephen Products LLC, Palatine, IL (US)

(72) Inventor: Christopher J. Allen, Sr., West Hartford, CT (US)

(73) Assignee: WEBER-STEPHEN PRODUCTS LLC, Palatine, IL (US)

( * ) Notice: Subject to any disclaimer, the term of this patent is extended or adjusted under 35 U.S.C. 154(b) by 94 days.

This patent is subject to a terminal disclaimer.

(21) Appl. No.: 16/052,832

(22) Filed: Aug. 2, 2018

(65) Prior Publication Data

US 2018/0372555 A1 Dec. 27, 2018

Related U.S. Application Data

(63) Continuation of application No. 14/932,955, filed on Nov. 4, 2015, now Pat. No. 10,067,004.

(Continued)

(51) Int. Cl.
*G01K 7/00* (2006.01)
*G01K 1/024* (2021.01)

(Continued)

(52) U.S. Cl.
CPC ............ *G01K 1/024* (2013.01); *G01K 1/028* (2013.01); *G01K 1/14* (2013.01); *G01K 1/143* (2013.01);

(Continued)

(58) Field of Classification Search
None
See application file for complete search history.

(56) References Cited

U.S. PATENT DOCUMENTS 5,746,114 A 5/1998 Harris
6,046,674 A 4/2000 Irwin
(Continued)

OTHER PUBLICATIONS

No Author, Brookstone, Grill Alert™ Talking Remote Meat Thermometer Instructions, Mar. 8, 2005, 6 pages.

(Continued)

*Primary Examiner* — Lisa M Caputo
*Assistant Examiner* — Nasir U. Ahmed
(74) *Attorney, Agent, or Firm* — Hanley, Flight & Zimmerman, LLC

(57) ABSTRACT

A temperature monitoring system for monitoring a temperature status of an item from a location different than a location at which the item is located is disclosed. The temperature monitoring system includes a base having a top surface and a bottom surface, and a first unit removably engageable with the top surface of the base in at least a first orientation and a second orientation. The first unit is configured to monitor a measured temperature, to display information regarding the measured temperature, and/or to transmit temperature information to a user device. The temperature monitoring system may also include at least one thermal or temperature probe configured to measure the temperature of the item, including a probe tip, probe wire, and probe plug. The temperature monitoring system may also include one or more probe supports configured to releasably attach to the base and configured to releasably retain a thermal probe thereon.

19 Claims, 17 Drawing Sheets

Related U.S. Application Data

(60) Provisional application No. 62/075,217, filed on Nov. 4, 2014, provisional application No. 62/075,219, filed on Nov. 4, 2014.

(51) Int. Cl.
*G01K 13/00* (2021.01)
*G01K 1/14* (2021.01)
*G01K 1/143* (2021.01)
*G01K 1/02* (2021.01)

(52) U.S. Cl.
CPC ......... *G01K 13/00* (2013.01); *G01K 2207/06* (2013.01)

(56) References Cited

U.S. PATENT DOCUMENTS

| | | |
|---|---|---|
| 6,080,972 A | 6/2000 | May |
| 6,539,842 B1 | 4/2003 | Chapman |
| 6,712,505 B2 | 3/2004 | Chapman |
| 6,811,308 B2 | 11/2004 | Chapman |
| 6,836,212 B2 | 12/2004 | Sawinski |
| 6,850,861 B1 | 2/2005 | Faiola |
| 7,128,466 B2 | 10/2006 | Chang |
| 7,201,099 B2 | 4/2007 | Harris, Jr. |
| 7,372,368 B2 | 5/2008 | Chapman |
| 7,703,389 B2 | 4/2010 | McLemore |
| 8,661,701 B2 | 3/2014 | Wixey et al. |
| 8,931,400 B1 | 1/2015 | Allen |
| 10,067,004 B1 | 9/2018 | Allen |
| 2003/0202558 A1 | 10/2003 | Chung |
| 2010/0011631 A1 | 1/2010 | Thompson |
| 2010/0303972 A1 | 12/2010 | Srivastava |
| 2011/0049149 A1 | 3/2011 | Shih |

OTHER PUBLICATIONS

No Author, Weber Style™ Digital Thermometer (available prior to May 28, 2009) Accessed May 28, 2010. http://store.weber.com/items/WeberStyle/Detail.aspx?pid=1131. 1 page.

United States Patent and Trademark Office, "Non-Final Office Action," issued in connection with U.S. Appl. No. 14/932,955, dated Oct. 31, 2017, 9 pages.

United States Patent and Trademark Office, "Notice of Allowance and Fee(s) Due," issued in connection with U.S. Appl. No. 14/932,955, dated May 17, 2018, 9 pages.

TEMPERATURE MONITORING SYSTEMS AND METHODS

CROSS-REFERENCE TO RELATED APPLICATIONS

This application is a continuation of U.S. Ser. No. 14/932,955, filed on Nov. 4, 2015, now allowed, which claims benefit under 35 U.S.C. § 119(e) to U.S. Provisional Patent Application Nos. 62/075,217 and 62/075,219, filed Nov. 4, 2014, and claims priority to such applications, which are incorporated by reference herein in their entirety.

FIELD OF THE INVENTION

The present invention relates to temperature monitoring systems and methods, such as for food preparation. Particularly, the present invention relates to digital cooking thermometers.

BACKGROUND INFORMATION

In many heating processes such as food preparation and cooking, the temperature of the item or material being heated is of critical importance in obtaining a suitable or desired result. In cooking, for example, the temperature of the food plays a role, often determinative, in the degree to which the food is cooked. The temperature itself may be indicative as to a degree to which the food is cooked. The degree to which the food is cooked is not only relevant to the taste of the food, as may be desired by the person consuming food, but also highly relevant to the safety of the food. To this end, for example, the U.S. Department of Agriculture (USDA) has issued guidelines establishing food temperatures at which it considers food, e.g., beef, poultry, pork, etc. to be adequately cooked to sufficiently destroy microbial or other biological contaminants in the food so as to be generally safe for consumption. In addition, the temperatures necessary to provide a desired degree of cooking or taste (e.g., rare, medium, well-done) are generally known.

For this purpose, food thermometers may be used to measure the temperature of the food. A drawback of standard food thermometers is that a person desiring to determine the temperature of the food is required to be physically present at the location the food is being cooked in order to view the temperature of the food displayed by the thermometer. This inconveniently prevents the user from attending to other activities and/or requires the user to return to the cooking location to monitor the progress of the cooking. If the user does not return in time, the food may be overcooked. Moreover, if a grill or oven is being employed to cook the food, opening the grill or oven is required to measure the temperature, which may result in temperature loss and/or inconsistent temperature cooking.

U.S. Pat. No. 8,931,400, which is incorporated by reference in its entirety, includes a first unit that may be placed at a location adjacent to a cooking area. A temperature probe attachable to the first unit measures the temperature of the item and transmits the temperature to a second unit located at a different location, e.g., remote from the item being cooked. The first unit may rest on a surface, such as counter, shelf or stove top.

SUMMARY OF THE INVENTION

The inventor has determined that a temperature monitoring system that allows for multiple mounting positions and/or locations would be beneficial to users. The inventor has also determined that an improved temperature probe storage system would also be beneficial to users.

A temperature monitoring system includes a base and a first unit removably engageable with the base. The bottom surface of the base contains a mounting portion for mounting or placing the base onto a surface. The first unit is removably engageable with the top surface of the base in at least a first orientation and a second orientation. The first unit is configured to monitor the temperature of an item and in some embodiments to display information regarding the measured temperature. In some embodiments, the displayed information includes one or more of a color indicative of a temperature, a color indicative of a relative temperature, or a numerical temperature.

In some embodiments, the top surface of the base defines an angled surface relative to the bottom surface, and the first unit, when engaged to the base, defines an angled surface relative to the bottom surface of the base.

In some embodiments, the bottom surface of the base is configured to be mounted onto an angled or vertical surface. In some such embodiments, the bottom surface of the base contains at least one magnetic portion, which is configured to magnetically mount the base onto a magnetic surface. In some embodiments, the first unit is configured to engage with the base in a first orientation when the base is mounted on a substantially horizontal surface, and in a second orientation when the base is mounted on a substantially vertical surface. In such embodiments, the angled surface permits improved viewing of the displayed temperature information, which may also be improved by the orientation of the first unit.

In some embodiments, the first unit is configured to wirelessly communicate with a user device to transmit information regarding the measured temperature, and/or to receive instructions or commands from the user device.

In some embodiments, the temperature monitoring system further comprises a thermal probe configured to measure a temperature of an item and to communicate the measured temperature to the first unit. In some such embodiments, the thermal probe comprises a probe wire that extends between a probe tip and a probe plug, wherein the probe plug is configures to electronically engage with the first unit and the probe tip is configured to measure the temperature of an item. In some such embodiments, the first unit is configured to be able to engage with the base in an orientation whereby the probe wire does not obstruct a user's view of the displayed temperature information.

In some embodiments, the temperature monitoring system further comprises at least one probe support configured to releasably attach to the base and configured to releasably retain a thermal probe thereon. In some such embodiments, the top surface of the probe support is configured to magnetically attach to the bottom surface of the base. In some embodiments, the bottom surface of the first probe support further is configured to releasably engage with the top surface of a second probe support.

The present disclosure also relates to a method for mounting a temperature monitoring unit for viewing the information displayed thereon. In some embodiments, the method comprises mounting the base of a temperature monitoring system onto a first surface at a first orientation, e.g., horizontal; either the first unit already engaged or engaging the first unit onto the top surface of the base in a first orientation.

In some embodiments, the method further comprises detaching the bottom surface from the first surface and mounting it onto a second surface at a different orientation, e.g., vertical. In some embodiments, the method further comprises removing the first unit from the base, and engaging the first unit in a second orientation relative to the base.

In some embodiments, the system comprises first means for monitoring a measured temperature of an item, the first means having second means for displaying information regarding the measured temperature, third means for placing or mounting on a surface and for angling the second means at an angle relative to said surface; and the first means also having fourth means for removably engaging the first means with the third means in at least a first orientation and a second orientation. In some such embodiments, the first means includes a first unit configured to monitor a measured temperature of the item, the second means is a display surface of the first unit; the third means is a base including a top surface and a bottom surface, the top surface being angled relative to the bottom surface, and the bottom surface including a mounting portion configured for mounting or placing the base onto the surface, and the fourth means is a bottom portion of the first unit removably engageable with the top surface of the base.

In some embodiments, the system further includes fifth means for wirelessly transmitting said information from the first means or first unit to a unit remote from the first means. In some such embodiments, the fifth means is one or more of Bluetooth®, Bluetooth® Low Energy ("BLE"), Wi-Fi, infrared, or cellular data connection.

Other objects and advantages of the present invention will become apparent in view of the following detailed description of the embodiments and the accompanying drawings.

DETAILED DESCRIPTION OF EMBODIMENTS OF THE INVENTION

Figure 1:
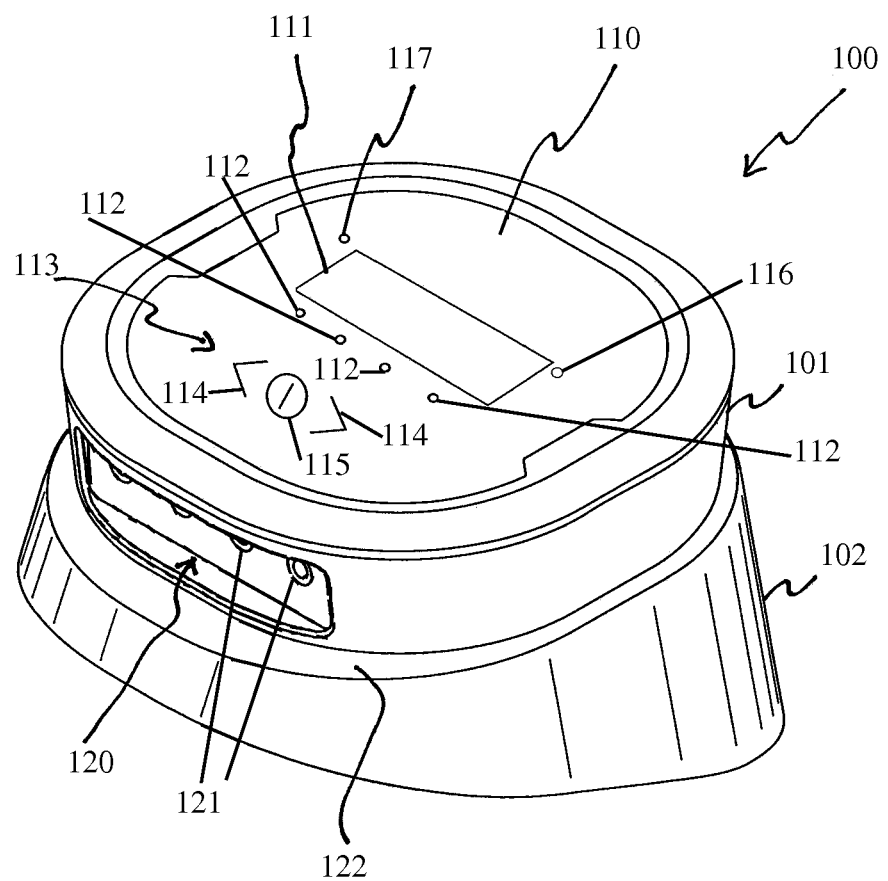
FIG. 1 is a right perspective view of a temperature monitoring system.

The present invention provides temperature monitoring systems and methods whereby the temperature status of an item or items may be monitored and/or controlled from a location that is different from the location of the item(s). In various embodiments, the temperature status may be monitored and/or controlled via communication between a first device located at or near the location at which the item is located, and a second device located at a different location. The first device may include or be operatively connected to one or more temperature sensors or probes by which the temperature(s) of the item(s) is determined and communicated to the first device. Temperature information is then transmitted to the second device, which is relayed to a user by visual or other indication.

The heating parameters of the item may be entered, programmed, or selected by a user using the second device. The second device may then determine various heating characteristics of the item, such as, by way of example only, heating time. The second device may utilize the temperature received from the first device to update the status and heating characteristics on a real-time or near real-time basis. In additional embodiments, heating parameters may be set, modified, or altered by a user utilizing the first device, which communicates this information to the second device. The second device then may adjust or update its programming and its determination of the heating characteristics and status of the item.

In various embodiments, the second device is a computer or computerized electronic device that is not specific to heating applications or specialized to function with the first device, but has the necessary existing hardware, firmware, and/or software capabilities so that a heating application, e.g., a program or computer application, may be installed and executed, on a temporary or permanent basis, and to communicate with the first device. Examples of such devices include, but are not limited to, smartphones (BlackBerry, Android, iPhone, etc.), computers (desktop, laptop, etc.), handheld computing devices, and other portable computerized devices (PDA, iPad, iPod, tablets, etc.). In these embodiments, only the first device and temperature sensors need be provided and/or purchased by the user, and a software application installed on the user's existing (or otherwise acquired) second device. Thus, the cost of a second device, from both the manufacturing and purchasing perspective, is avoided.

Such second devices also provide flexibility in the software application because the devices can take advantage of the existing capabilities of the second device. Such capabilities may include, by way of example only, storing and/or downloading (e.g., Internet) information such as multimedia for presentation or playback to the user, and the ability to easily alter and/or update the software application itself and the information stored in the second device utilized by the application. Further, where the second device is portable, the user may move to other locations and/or attend to other activities and remain updated as to the status of the food item. To where the user may move and remain updated from the first device is limited only by the built-in communication capabilities of the second device. In embodiments where the second device has multiple communication modes, e.g., wireless, Bluetooth®, internet, etc., these may be utilized and/or selected as needed or desired so that the second device may receive the temperature information from the first device.

The first device may transmit commands and/or receive information from the second device by means of wireless communication. For example, the first and second devices may communicate by Bluetooth®, Wi-Fi, infrared, etc. Alternatively or in combination with wireless communication, the first and second devices may communicate by wired means.

Embodiments of the present invention are directed to embodiments of the above described first device and may be used for food preparation, such as for cooking or heating food.

FIG. 1 shows a right perspective view of a first exemplary embodiment of a temperature monitoring system 100, such as a digital thermometer. Temperature monitoring system 100 includes a first unit 101 and a base 102. First unit 101 is a wireless device that can communicate with other electronic devices by means of Bluetooth®, Bluetooth® Low Energy ("BLE"), Wi-Fi, infrared, cellular data connection, or other type of wireless connection to convey information to the other device and/or receive instructions/commands from the other device.

First unit 101 is removably attached to the base 102. The attachment between the first unit 101 and the base 102 may be by magnetic attachment, snap fit, friction fit, a twist-lock mechanism or configuration, threaded attachment, and/or other removable attachment mechanism. Base 102 may be formed from plastics, rubber(s), composites, metals, or other suitable materials and/or combinations thereof. In some embodiments, base 102 is formed from materials that are heat resistant. Similarly, first unit 101 may be formed from plastics, composites, metals, or other suitable materials and/or combinations thereof, and in some embodiments, the materials are heat resistant.

First unit 101 of the temperature monitoring system 100 includes a display surface 110 and one or more ports or jacks 121 located in a recess 120. The display surface 110 includes a digital display 111, one or more indicators 112, and one or more buttons 113. First unit 101 of the temperature monitoring system 100 is configured to display numerical temperatures on the digital display 111 of an item, e.g., a food item, that is being monitored. First unit 101 may further comprise a symbol indicating the unit of temperature that is being measured, such as degree symbol 116. The temperature of the food item is obtained by a thermal probe (not shown in FIG. 1), or similar device, that is plugged into the first unit 101 at the one or more ports 121 located in the recess 120. In some embodiments the ports 121 may be temporarily sealed or covered, for example when not in use, with a removable and re-attachable port cover (not shown) formed from plastics, rubbers, silicon, or other similar materials. Alternatively, the recess 120 can be covered entirely by a removable and re-attachable face plate or other cover (not shown) that conforms to or fits over the indent region of ports 121, for example when not in use.

As shown in FIG. 1, one or more indicators 112 are located below the digital display 111. The indicators 112 are, for example, LED lights, and correspond to the one or more ports 121. A currently lit LED light of indicators 112 indicates the temperature received through the specific port 121 and associated thermal probe that is currently displayed on the digital display 111. Below the indicators 112 are one or more buttons 113. The buttons 113, as shown in FIG. 1, include toggle buttons 114, such as arrows or directional buttons, and a power button 115. Power button 115 is configured to power on and power off the first unit 101 of the temperature monitoring system 100 and/or to pair the first unit 101 via Bluetooth® communication with a user device such as a smart phone. The toggle buttons 114 are configured to allow a user to switch or toggle between the displayed temperatures received by each of the thermal probes plugged into the associated ports 121, with the currently displayed port 121 and associated probe indicated by the indicator 112.

The display surface 110 also includes an indicator 117. Indicator 117 is, for example, another LED indicator light that is configured to indicate when the first unit 101 is connected to another device via wireless communications, such as Bluetooth®, Bluetooth® Low Energy ("BLE"), Wi-Fi, cellular data connection, or other type of wireless connection.

Although shown in FIG. 1 with the buttons 113, the indicators 112, the indicator 117, and the digital display 111 located on the display surface 110, in alternative embodiments, some or all of these features may be located on other faces or locations of the first unit 101, or omitted therefrom. For example, the power button 115 and the toggle buttons may be located on the side surfaces of the first unit 101. Moreover, one or more other digital displays may be located on the display surface 110 and/or on other surfaces of the first unit 101, such as on the sides thereof.

Figure 2:
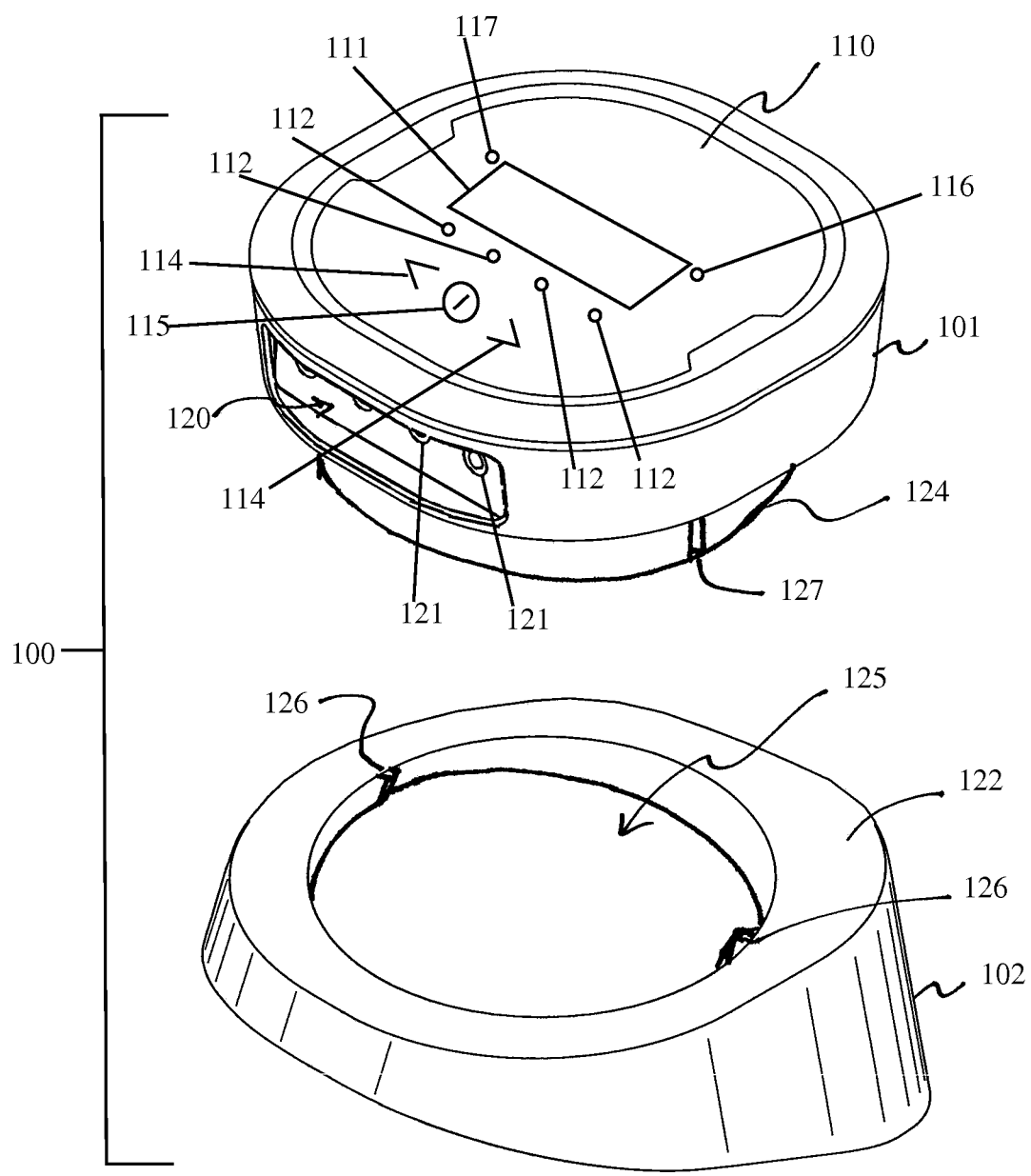
FIG. 2 is an exploded view of the temperature monitoring system of FIG. 1 with the base and first unit separated.

With reference to FIG. 2, the temperature monitoring system 100 is shown with the first unit 101 and the base 102 separated. As noted, the first unit 101 removably attaches to, and separates from the base 102. The first unit 101 includes a bottom portion 124 that fits into a recess 125 of a top surface 122 of the base 102 by magnetic attachment, press fitting, friction fitting, snap fitting, or other means of attachment. The recess 125 may include protrusions 126 that ensure that the first unit 101 is attached in a particular orientation. First unit 101 may include corresponding channels or indents 127 that align with protrusions 126. Those skilled in the art will appreciate that alternative means of alignment may be used without departing from the scope of this disclosure. Further, in some embodiments, protrusions 126 and channels 127 may be omitted.

The separation of the first unit 101 from the base 102 enables a user to change the orientation of the display surface 110 relative to the base 102. The top surface 122 of base 102 is angled allowing for different orientations of the first unit 101 and providing different viewing angles of the display surface 110. In addition to removing first unit 101 from base 102 to change the orientation, removal of the first unit 101 from the base 102 also allows a user to access an access panel (not shown in FIG. 2) of first unit 101 where batteries may be located to power the first unit 101. Also accessible through the access panel of first unit 101 is a reset button.

Figure 3:
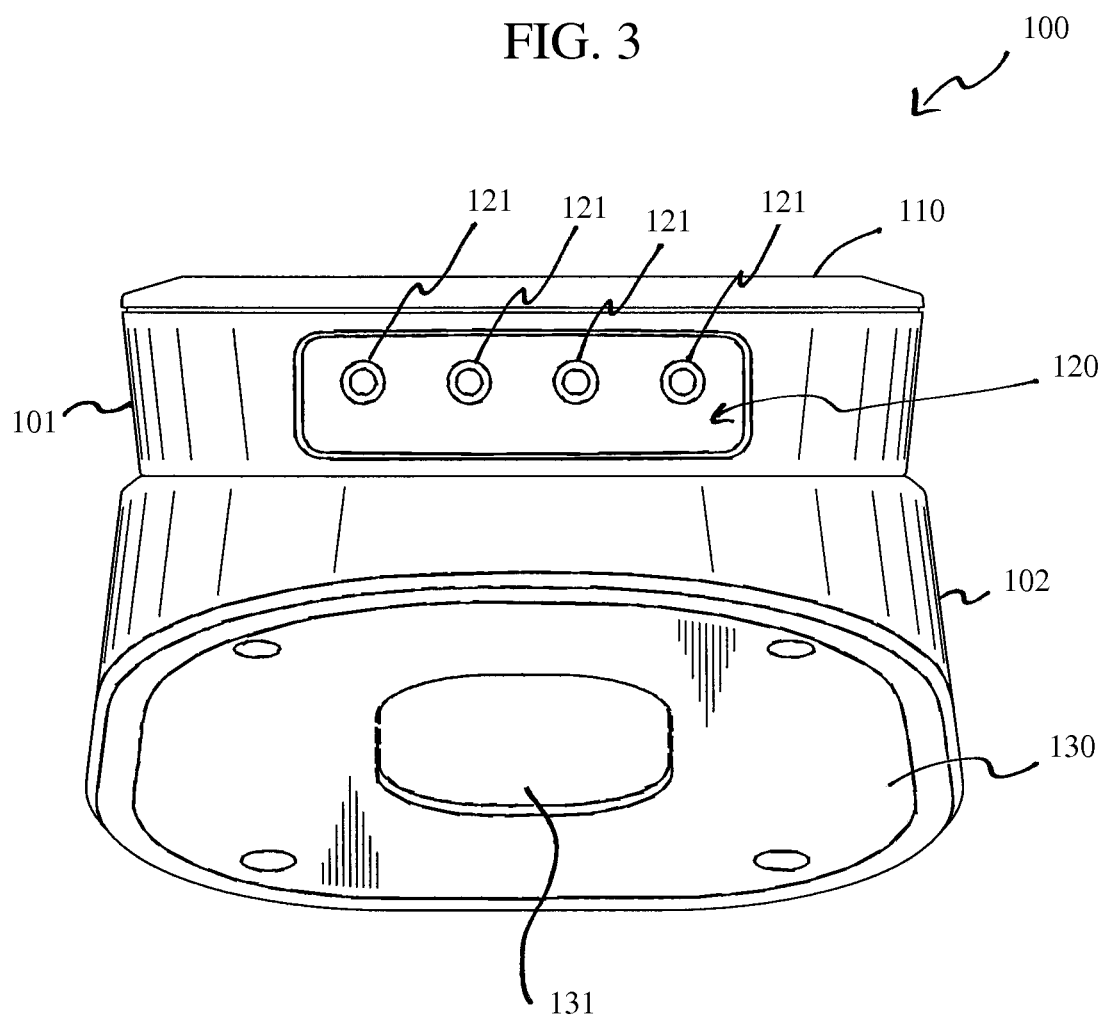
FIG. 3 is a front view of the temperature monitoring system of FIG. 1.

Turning now to FIG. 3, a front view of the temperature monitoring system 100 is shown. As shown, there are four ports 121 located in recess 120 each configured to receive a thermal probe plug. Also shown is the bottom surface 130 of base 102 including a magnetic portion 131. The magnetic portion 131 enables the temperature monitoring system 100 to magnetically, and removably, attach to a metal surface or to probe supports, as described herein. Accordingly, the temperature monitoring system 100 can be placed on a horizontal or flat surface (FIG. 4) or may be removably attached to an inclined or vertical surface (FIG. 5) and be magnetically held thereon.

Figure 4:
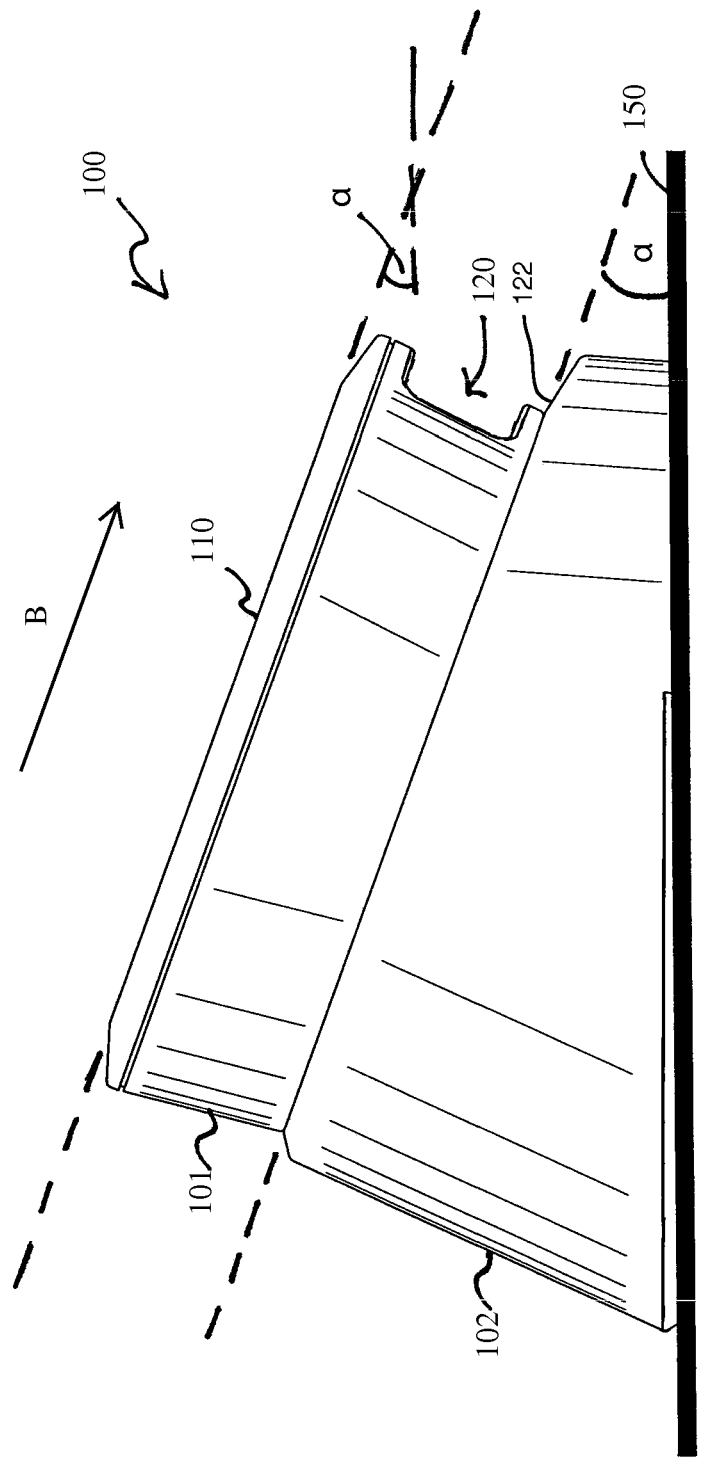
FIG. 4 is a left side view of the temperature monitoring system of FIG. 1 on a horizontal surface in a first orientation.

In FIG. 4, the temperature monitoring system 100 is shown placed on a flat or horizontal surface 150 in a first orientation, indicated by angle α and arrow B. The top surface 122 of the base 102 defines an inclined or angled surface at an angle α. When the first unit 101 is attached to the base 102, the top surface with display surface 110 of first unit 101 is angled upward toward the user at an angle α, and providing a first viewing angle. The inclined surface of the display surface 110 provides an advantageous viewing angle so that a user can easily read the displayed information provided on display surface 110. Arrow B indicates the direction that a user, looking at the display surface 110, would read the output information displayed thereon, i.e., from top to bottom of the first unit 101 (or left to right in FIG. 4). As seen in FIG. 4, the display surface 110 slopes toward horizontal surface 150 in the direction of arrow B (which, in the illustrated embodiment, is downwardly). A user will naturally associate the portion of the display surface 110 that is a greater distance from the horizontal surface 150 with the "top" of the display surface and the portion of the display surface 110 that is closer to the horizontal surface with the "bottom" of the display, and will accordingly read the display from a position so that the display is "right side up" for the user. From such position, the display surface 110 is canted or angled toward the user (from the horizontal), at angle α to improve viewing.

If however surface 150 of FIG. 4 represents a vertical surface to which the temperature monitoring system 100 is magnetically attached, the angle of viewing could be awkward to a user, or even upside down to a user. Further, if the temperature monitoring system 100 is attached to a vertical surface in this orientation, any thermal probes plugged into the ports 121 of recess 120 would extend out of the top of the first unit 101 and may obstruct the view of the display surface 110 or may get in the way of a user during operation.

Figure 5:
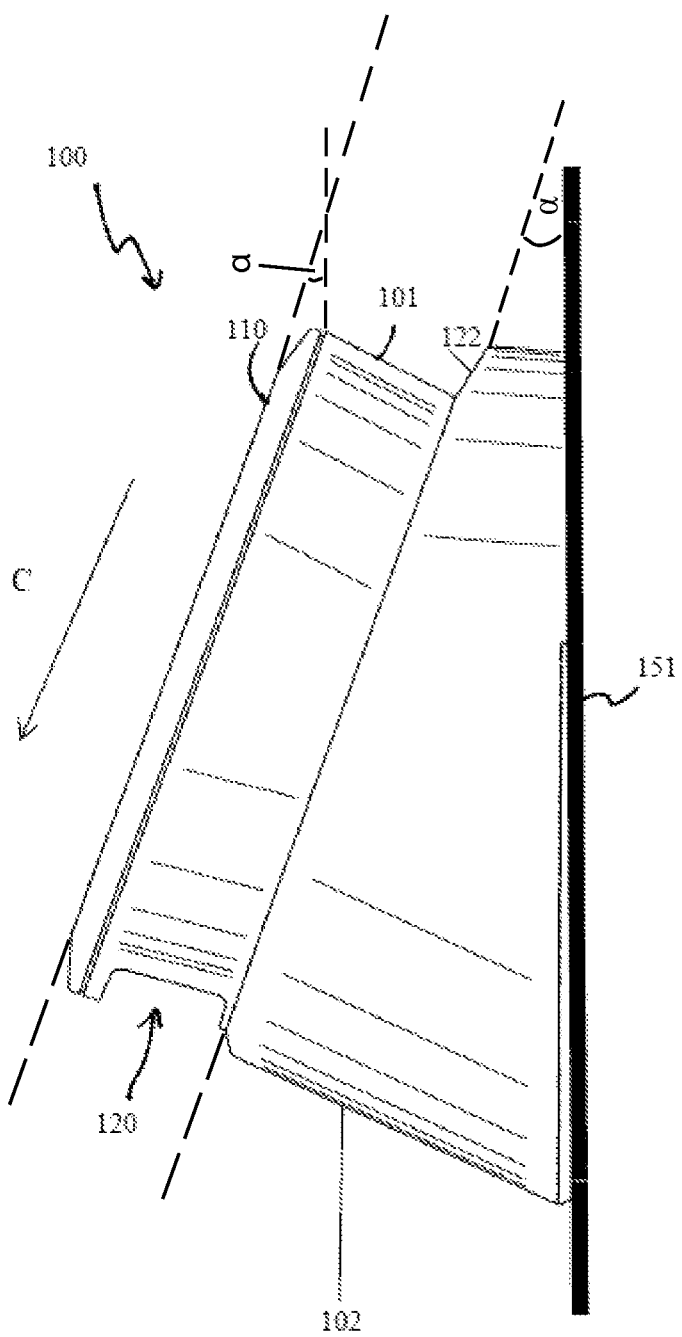
FIG. 5 is left side view of the temperature monitoring system of FIG. 1 on a vertical surface in a second orientation.

Advantageously, as noted above, the first unit 101 is removably attached to the base 102. This permits the first unit 101 to be removed from the base 102, and rotated to an alternate or second orientation as indicated by arrow C, as shown in FIG. 5. The second orientation, in this embodiment, is 180° rotated from the first orientation and provides a second viewing angle. As shown in FIG. 5, the temperature monitoring system 100 is attached to a vertical surface 151. The top surface 122 of the base 102 defines an inclined or angled surface at the same angle α relative to the vertical surface 151 as the top surface 122 is inclined relative to the horizontal surface 150 as seen in FIG. 4. When the first unit 101 is attached to the base 102, the top surface with display surface 110 of first unit 101 is angled outward from the vertical surface 151 toward the user at angle α. As attached to the surface and in the second orientation, a user can read the displayed information on display surface 110 clearly, and in the correct direction as indicated by arrow C. That is, as seen in FIG. 5, the display surface 110 slopes toward vertical surface 151 in the direction of arrow C, and this cants or angles the display toward the user (from the vertical), at angle α, to improve viewing. Furthermore, any thermal probes that are plugged into the ports 121 of recess 120 will extend out of the bottom (or downward direction) of the first unit 101 such that the probes will not interfere with viewing the display surface 110 or get in the way of a user operating the first unit 101.

The ability to have multiple orientations is achieved by the base 102 being angled at angle α, and rotating the first unit 101 on the base 102. Although described herein with first and second orientations, in some embodiments any orientation can be achieved so that a user can set an appropriate orientation for using the temperature monitoring system 100. For example, although shown in FIGS. 4 and 5 with a horizontal surface 150 and vertical surface 151, respectively, a surface can have any orientation, such as horizontal, inclined, etc., and the first unit 101 can be adjusted on the base 102 such that the best viewing angle and/or configuration of thermal probes can be achieved based on a user's experience.

Figure 6:
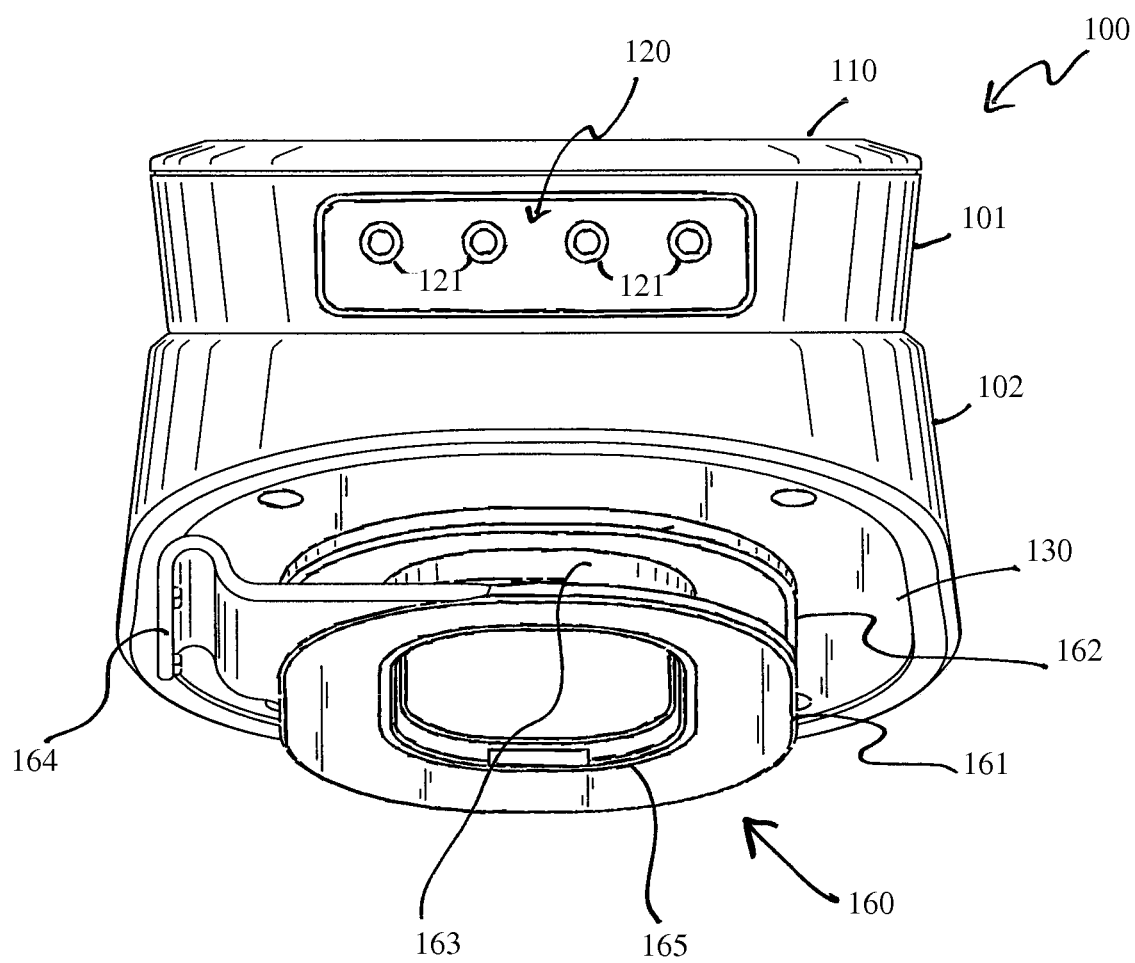
FIG. 6 is front view of the temperature monitoring system of FIG. 1 with a probe support attached thereto.

Referring now to FIG. 6, a front view of the temperature monitoring system 100 of FIG. 1 is shown with a probe support 160 attached thereto. Probe support 160 removably attaches to the bottom surface 130 of base 102. The attachment between the probe support 160 and the base 102 may be by magnetic attachment between a top surface of the probe support 160 and the magnetic portion 131 (not visible in FIG. 6). Alternatively, the attachment between the probe support 160 and the base 102 may be by snap fitting, a twist-lock mechanism or configuration, threaded connection, and/or other removable attachment mechanism.

Probe support 160 includes a bottom 161, a top 162, a probe wrap surface 163, and a probe holder 164. The bottom 161 includes a recess 165 that is configured to connect to and attach to additional probe supports, as described herein. As shown in FIG. 6, the bottom 161 and top 162 of probe support 160 define larger diameters than the probe wrap surface 163. This allows for a wire of a probe (not shown in FIG. 6) to wrap around the probe wrap surface 163 and be held between the bottom 161 and the top 162. The distance between the bottom 161 and the top 162 is configured to be approximately the diameter of a probe plug, such that the probe plug can be friction fitted between the bottom 161 and the top 162. The probe holder 164 is configured to releasably retain a probe on the probe support 160, for example for storage.

Figure 7:
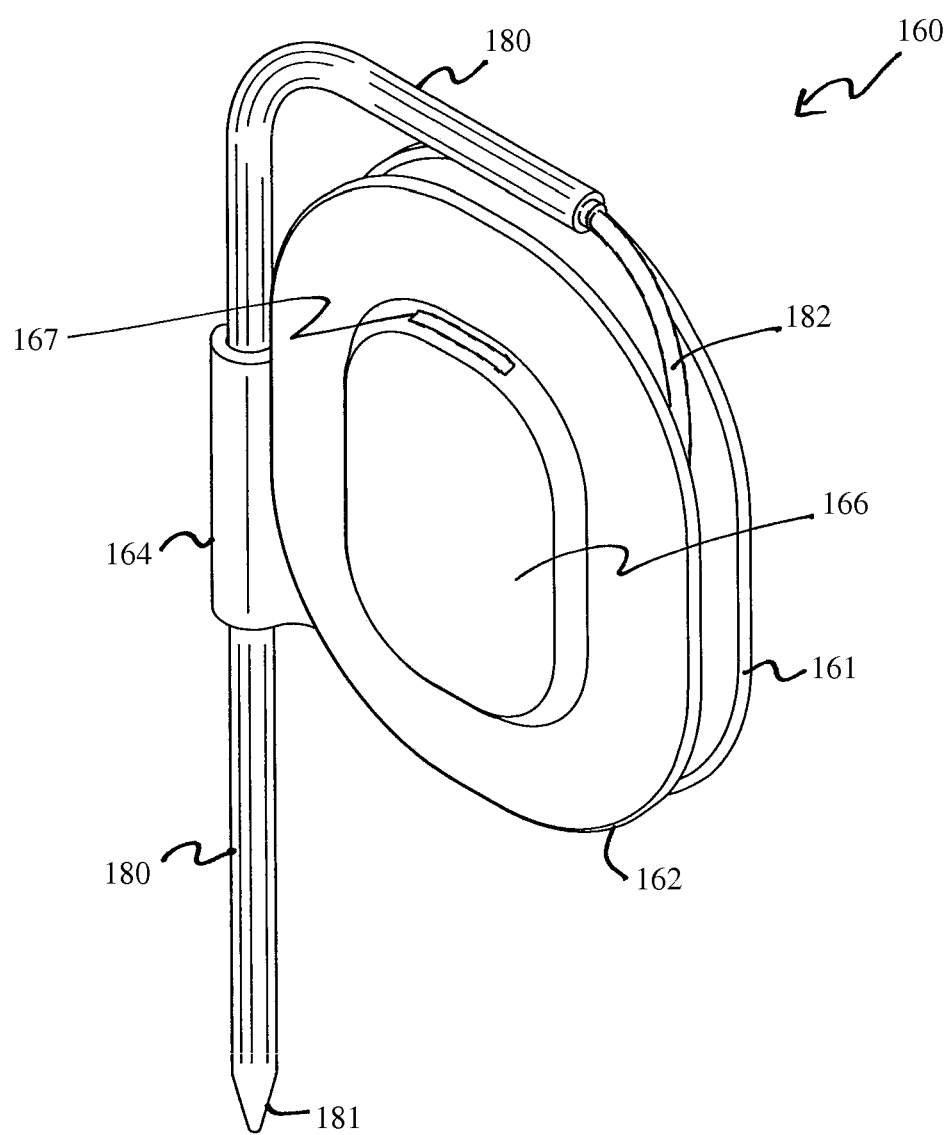
FIG. 7 is a top perspective view of a probe support and probe.
Figure 8:
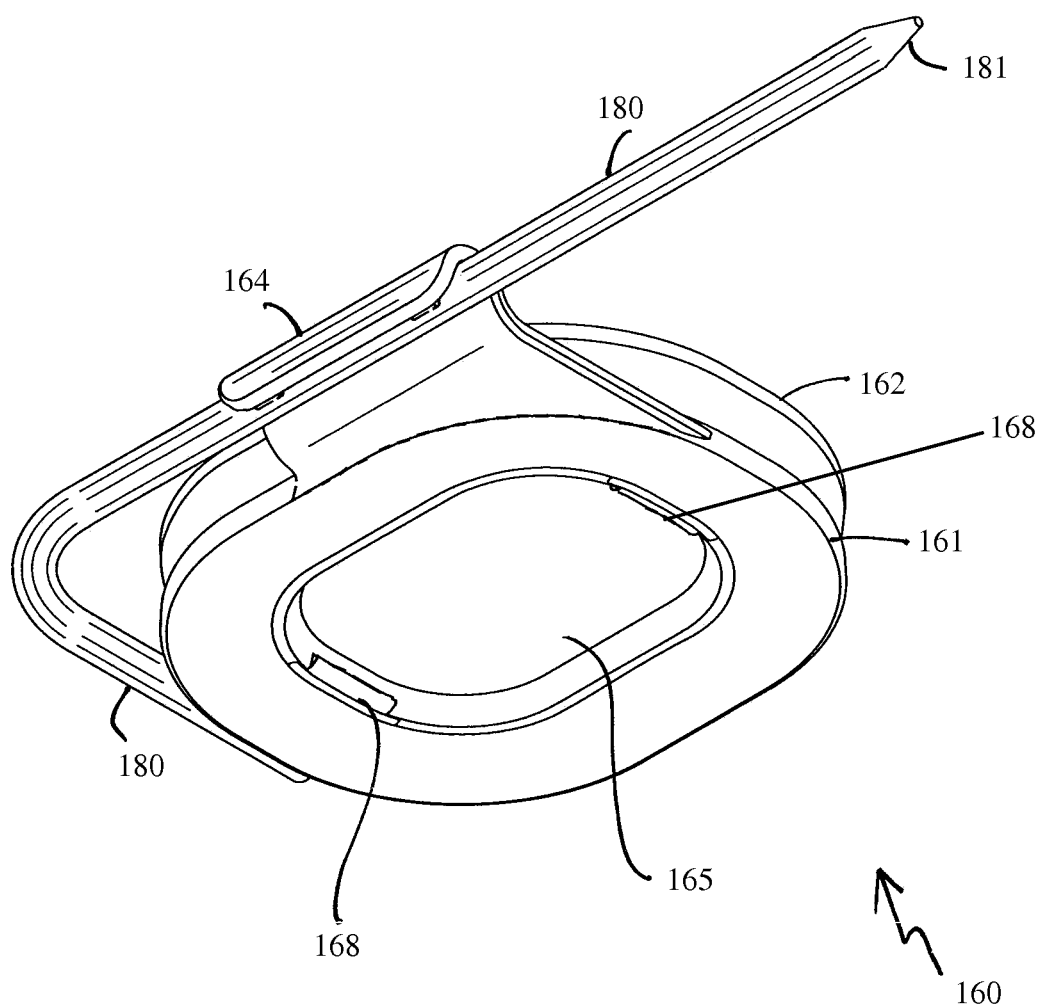
FIG. 8 is a bottom perspective view of the probe support and probe of FIG. 7.

FIGS. 7 and 8 show a probe support 160 not attached to the temperature monitoring system 100 but having a thermal probe 180 retained thereon. The probe 180 snap fits into the probe holder 164 and is releasably retained thereon. Probe 180 includes a tip 181 for piercing meat or other food stuffs to measure the temperature of the meat or other food stuffs. Further, probe 180 includes a probe wire 182 which ends in a probe plug (not shown in FIG. 7 or 8) that is configured to connect to the temperature monitoring system 100 in ports 121.

Figure 9:
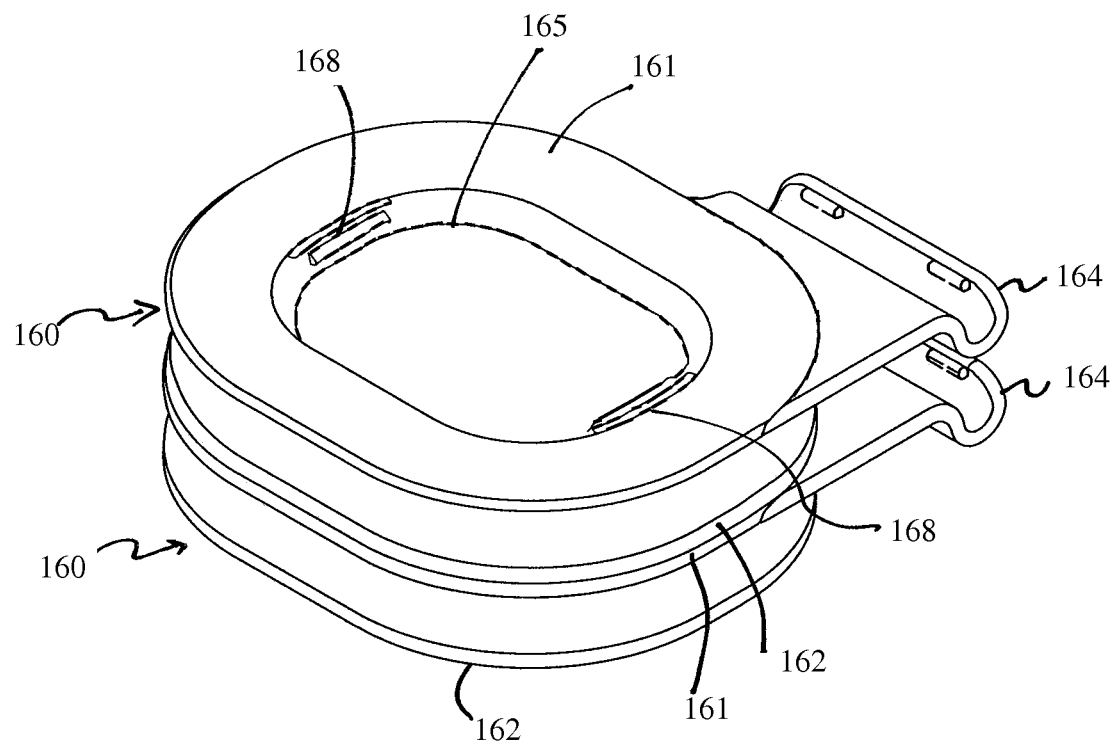
FIG. 9 is a bottom perspective view of two probe supports stacked together.

As shown in FIG. 7, the top 162 of probe support 160 includes a projection 166. Projection 166 may be metallic or contain metallic or magnetic materials to enable the probe support 160 to attach to the magnetic base 102 of the temperature monitoring system 100. Furthermore, the projection 166 enables the probe support 160 to releasably attach to additional probe supports, as shown in FIG. 9 and discussed below, in part by means of at least one first engagement part 167. Additionally, in alternative embodiments, the at least one first engagement part 167 can be used to removably attach the probe support 160 to the base 102 of the temperature monitoring system 100.

On the bottom of the probe support 160 is a recess 165, shown in FIG. 8. Recess 165 is configured to match the size and shape of the projection 166 and includes at least one second engagement part 168. The at least one first engagement part 167 and the at least one second engagement part 168 snap fit together to attach and stack two or more probe supports 160 together, as shown in FIG. 9 (without probes attached thereto). Although shown in FIG. 9 with only two probe supports 160 attached to each other, any number of probe supports can be attached to each other. Further, although described herein as snap-fitting between two probe supports, alternative means of attachment may be used, such as magnetic attachment, threads, friction fitting, twist-lock mechanisms, and/or other removable attachment means.

Figure 10:
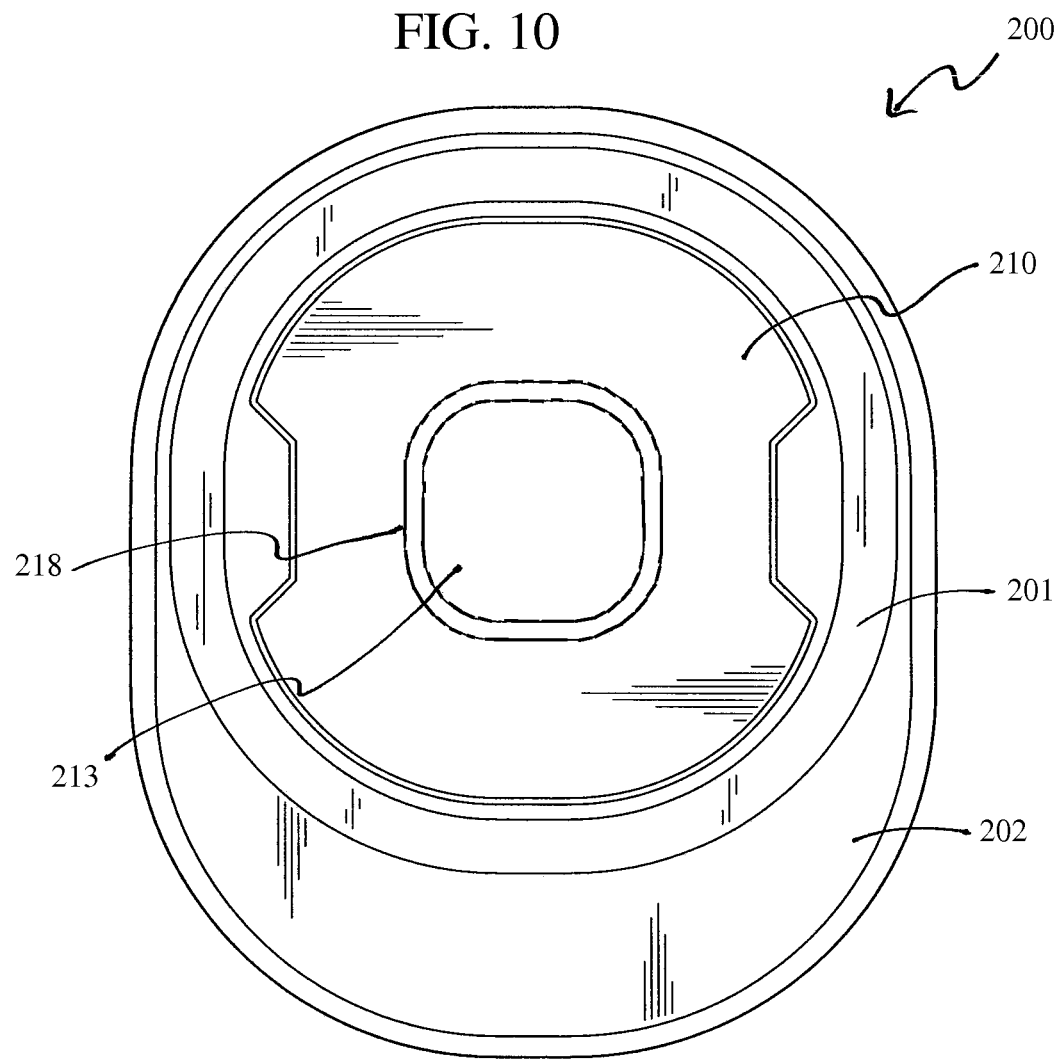
FIG. 10 is a top view of another temperature monitoring system.
Figure 11:
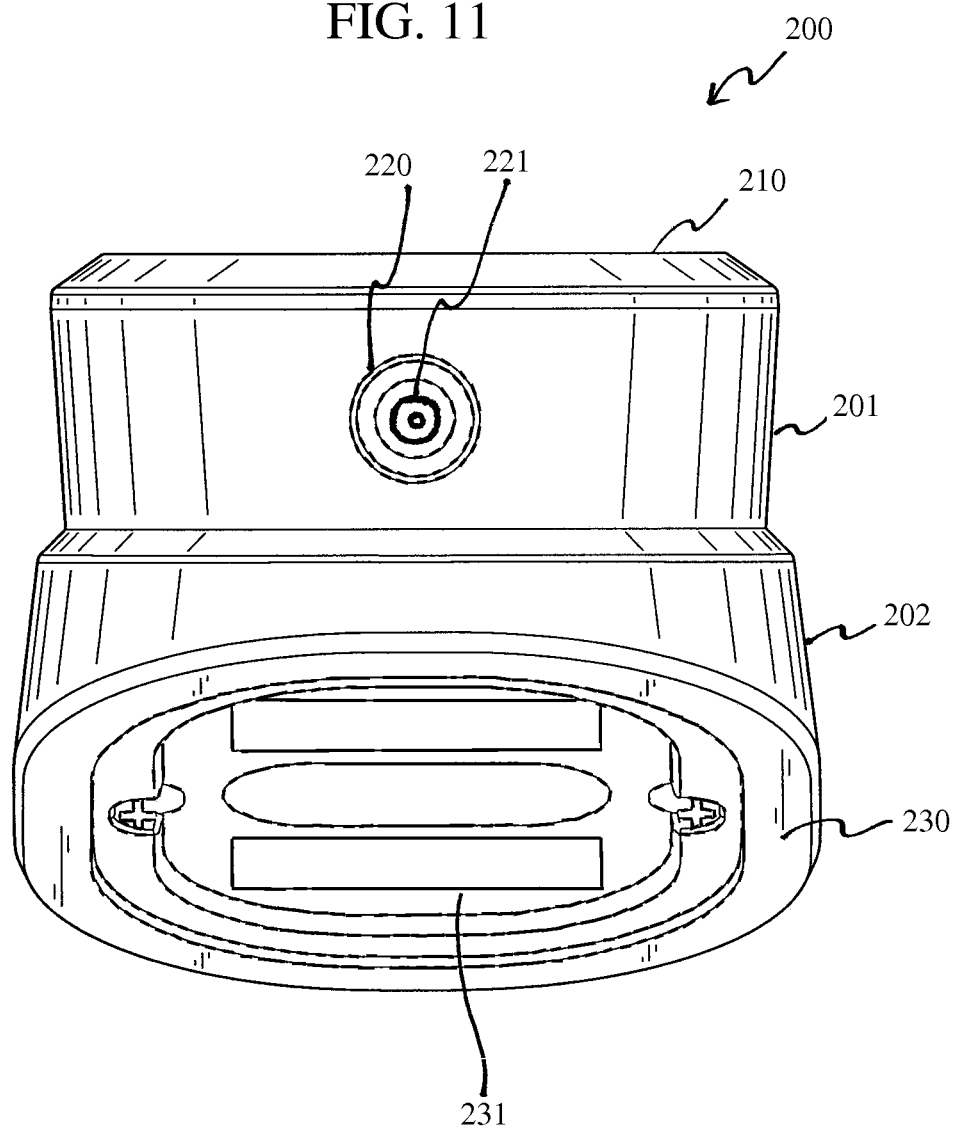
FIG. 11 is a front view of the temperature monitoring system of FIG. 10.
Figure 12:
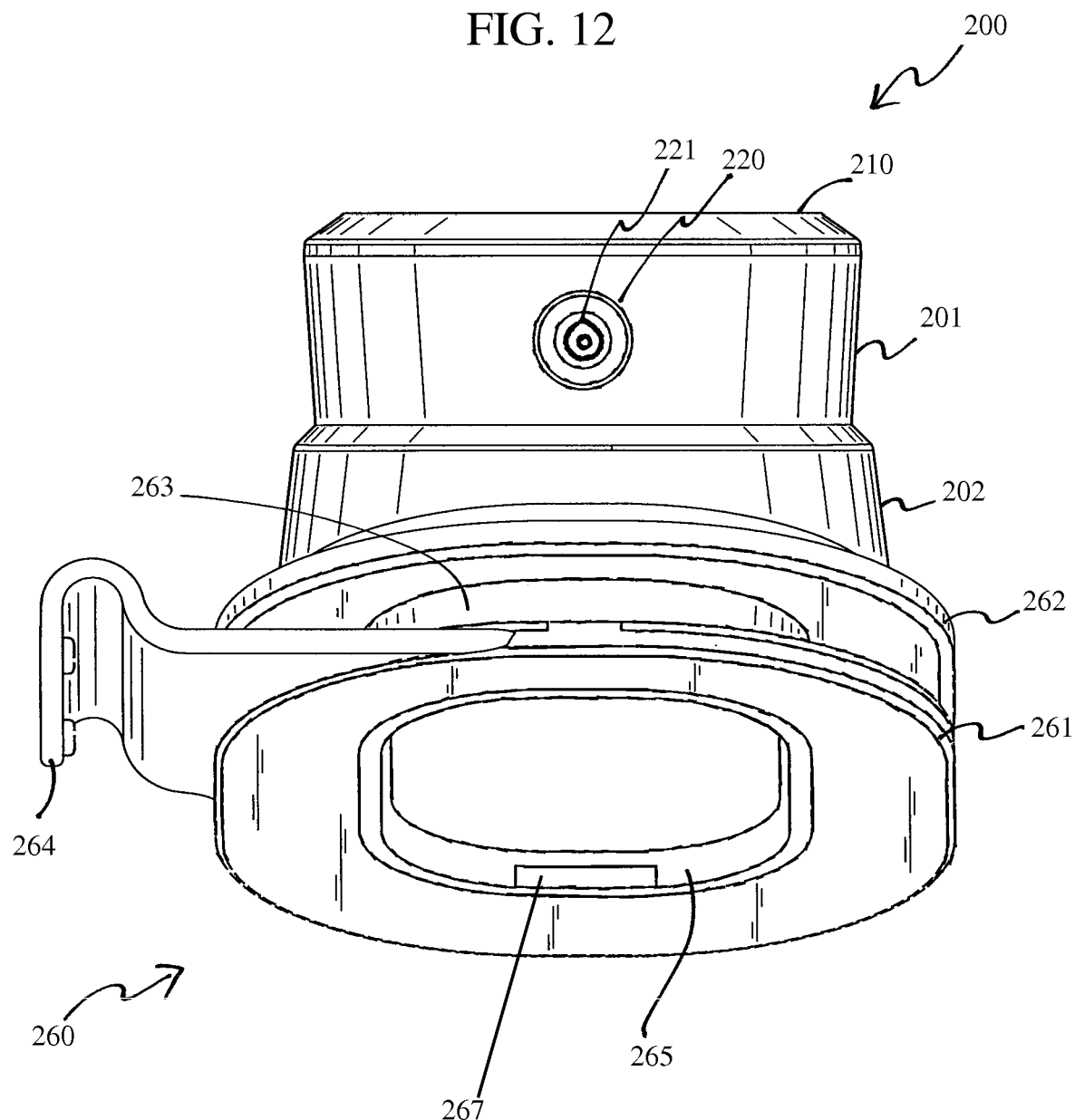
FIG. 12 is front view of the temperature monitoring system of FIG. 10 with a probe support attached thereto.

Turning now to FIGS. 10-12, another embodiment of a temperature sensing system is shown. Temperature sensing system 200 is similar to temperature sensing system 100, and similar features are labeled with similar reference numbers except preceded by a "2" instead of a "1." The temperature sensing system 200 includes a first unit 201 and an angled base 202 that includes a magnetic portion 231 on the bottom 230 thereof. The first unit 201 is removable from the base 202 to provide access to the bottom of the first unit 201 and/or allow for changes in orientation, as discussed above.

A primary difference between the embodiment shown in FIGS. 1-6 and the embodiment shown in FIGS. 10-12 is the size of the temperature sensing system. The temperature sensing system 200 of this embodiment is smaller than the embodiment previously discussed. Accordingly, the temperature sensing system 200 includes different display features on the display surface 210 (FIG. 10) and only one port 221 in recess 220 (FIGS. 11-12). FIG. 12 shows the temperature sensing system 200 as attached to a probe support 260 that is identical to the probe support 160, including bottom 261, top 262, probe wrap surface 263, probe holder 264, recess 265, and first engagement surface 267.

The display surface 210 includes an indicator 218 which surrounds a button 213. Button 213 is used to activate and/or power on/power off the temperature sensing system 200. The indicator 218 is an LED light ring that is used to indicate information about the temperature measured by a probe that is plugged in to the port 221. The indicator 218 can be programmed, by a remote user device such as a smart phone, to indicate closeness of a measured temperature to a desired or predetermined temperature by illuminating and/or flashing different colors, with each color associated with a range or temperature relative to the desired or predetermined temperature or representative of specific temperatures.

Figure 13:
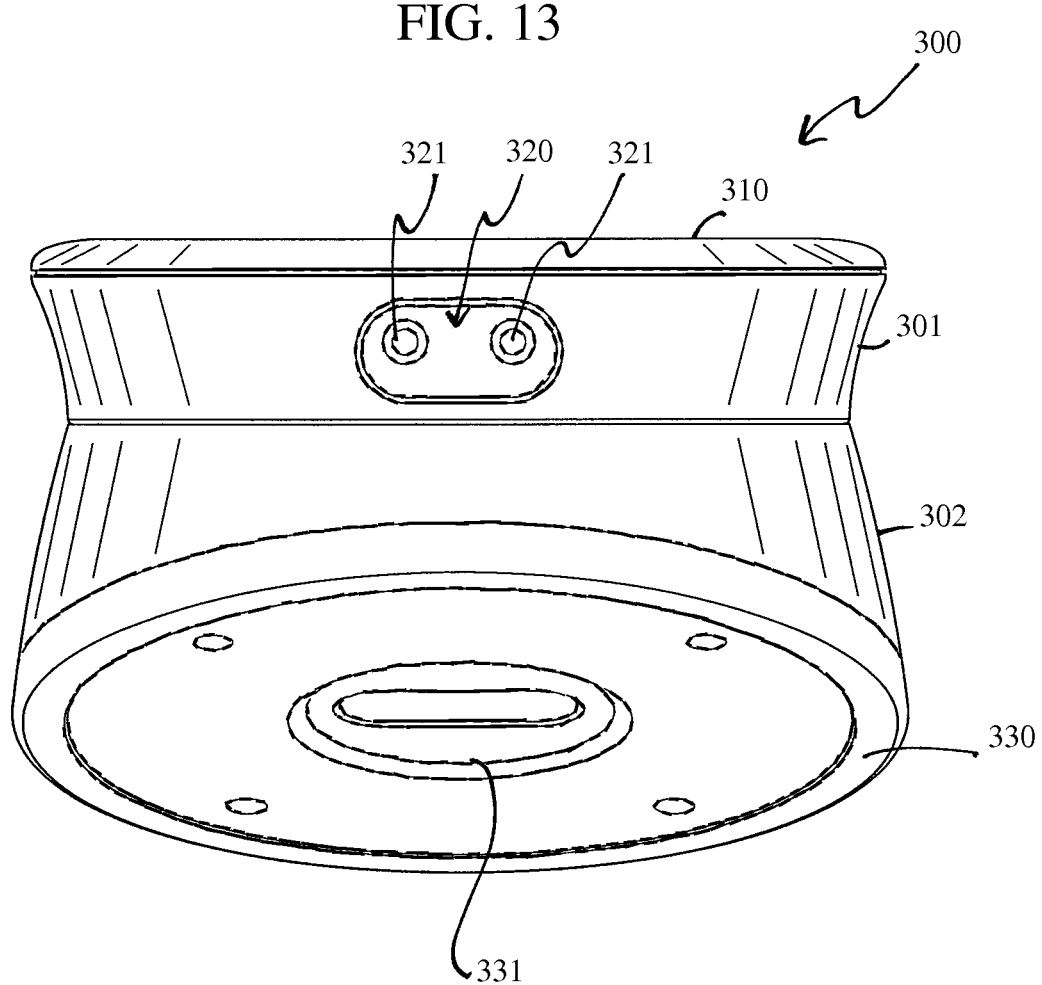
FIG. 13 is a front view of another temperature monitoring system.
Figure 14:
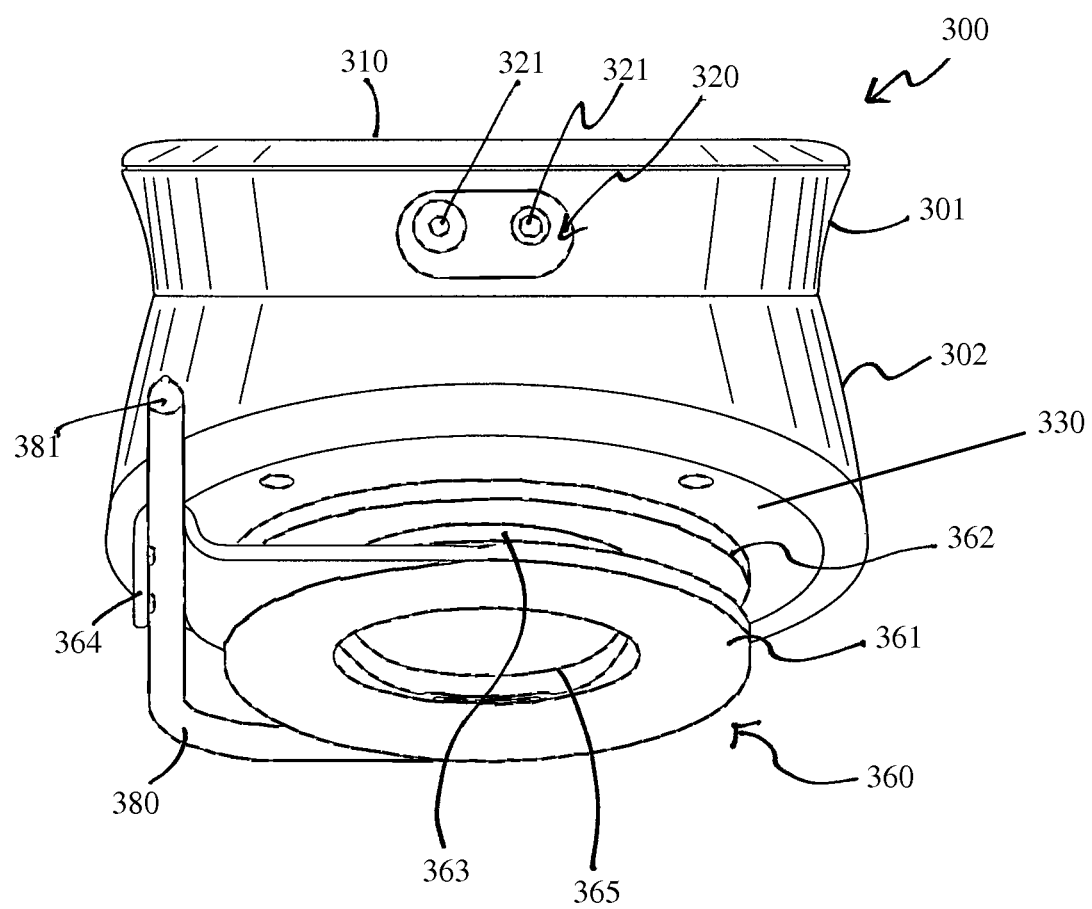
FIG. 14 is front view of the temperature monitoring system of FIG. 13 with a probe support attached thereto.

Turning now to FIGS. 13 and 14, another embodiment of a temperature sensing system is shown. Temperature sensing system 300 is similar to temperature sensing system 100, and similar features are labeled with similar reference numbers except preceded by a "3" instead of a "1." The temperature sensing system 300 includes a first unit 301 and an angled base 302 that includes a magnetic portion 331 on the bottom 330 thereof. The first unit 301 is removable from the base 302 to provide access to the bottom of the first unit 301 and/or allow for changes in orientation, as discussed above.

The display surface 310 of the temperature sensing system 300 is substantially similar to the display surface 110 of temperature sensing system 100. The primary difference between the features of the display surface 310 and display surface 110 is that display surface 310 has two indicators 312 to correspond to two ports 321 in recess 320.

Furthermore, as shown in FIG. 14, the probe support 360, used with temperature sensing system 300, has a different shape than the probe support 160, as shown and described in FIGS. 6-9. Although the shape is different, the features of probe support 360 are substantially similar to that of probe support 160. Specifically, multiple probe supports 360 may be stacked and removably attached by recess 365 in bottom 361 and a corresponding protrusion (not shown) of top 362. Probe support 360 releasably retains a probe 380 and a wire of probe 380 can be wrapped around the probe wrap surface 363.

Figure 15:
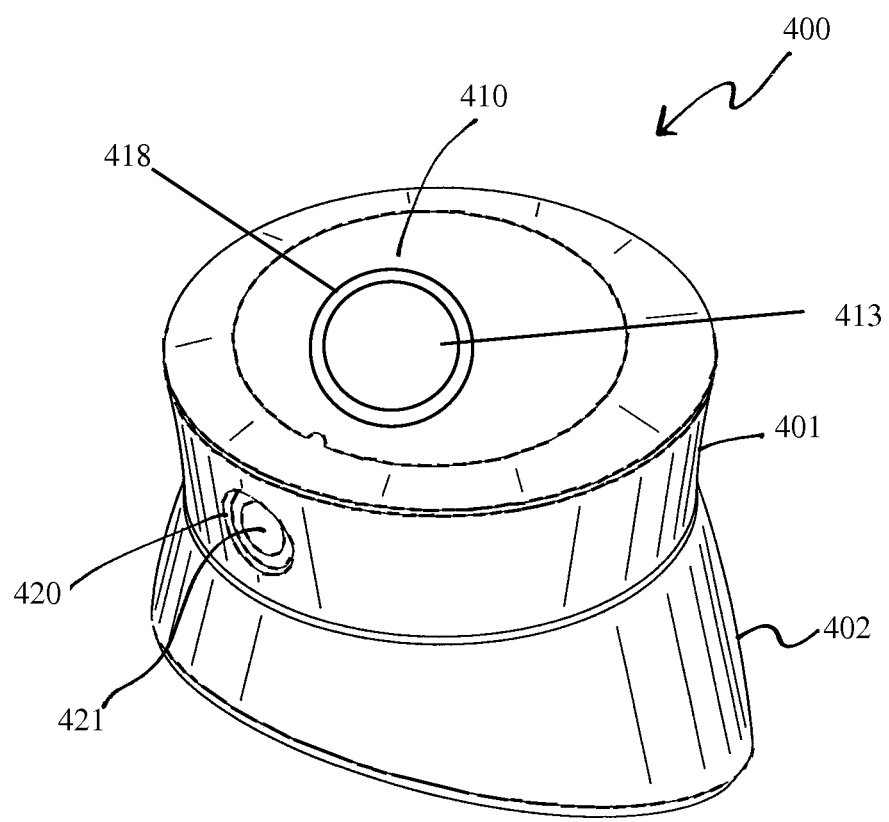
FIG. 15 is a top perspective view of another temperature monitoring system.
Figure 16:
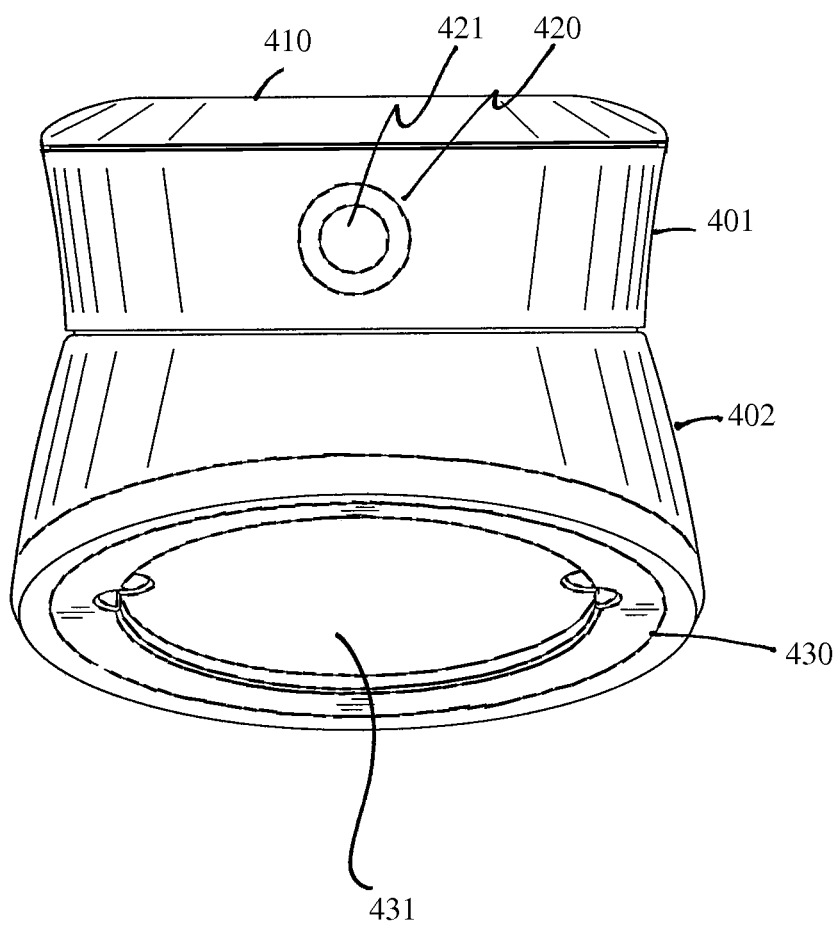
FIG. 16 is a front view of the temperature monitoring system of FIG. 15.
Figure 17:
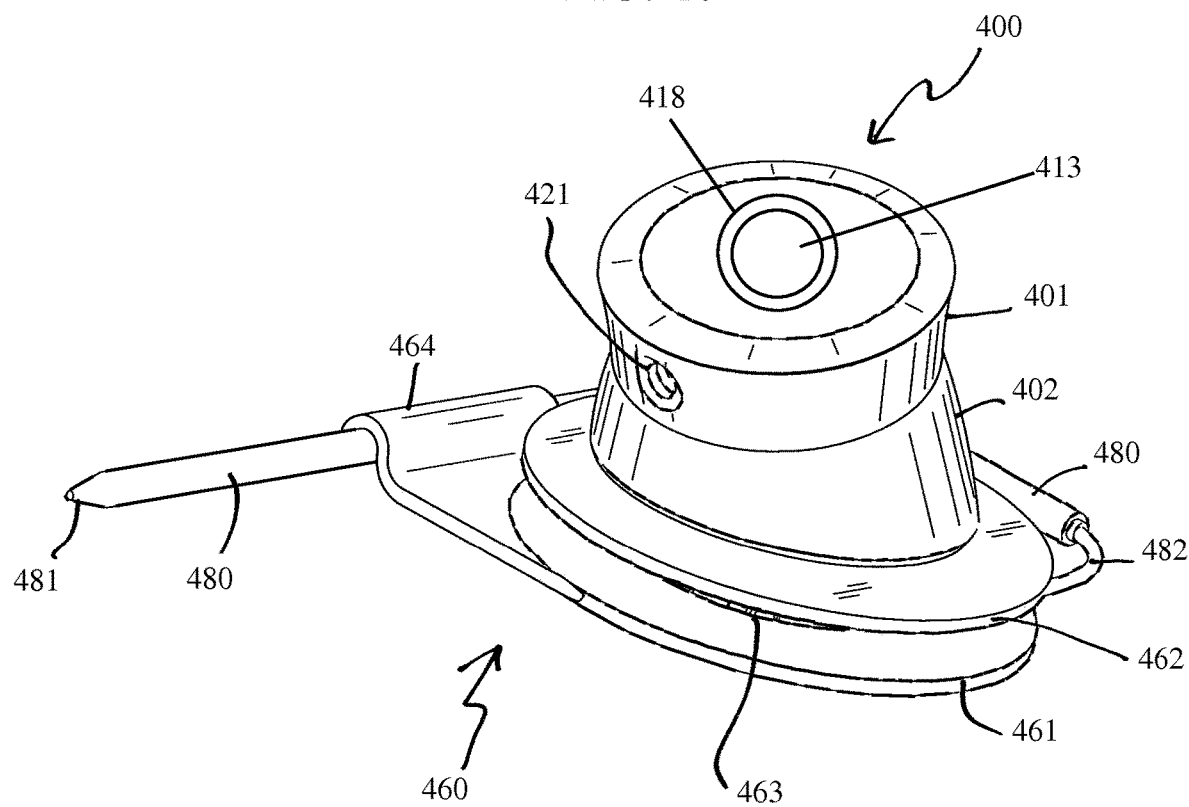
FIG. 17 is a top perspective view of the temperature monitoring system of FIG. 15 with a probe support attached thereto.

Turning now to FIGS. 15-17, another embodiment of a temperature sensing system is shown. Temperature sensing system 400 is similar to temperature sensing system 200, and similar features are labeled with similar reference numbers except preceded by a "4" instead of a "2." The temperature sensing system 400 includes a first unit 401 and an angled base 402 that includes a magnetic portion 431 on the bottom 430 thereof. The first unit 401 is removable from the base 402 to provide access to the bottom of the first unit 401 and/or allow for changes in orientation, as discussed above.

The display surface 410 of the temperature sensing system 400 is substantially similar to the display surface 210 of temperature sensing system 200, including button 413 and indicator 418. As shown in FIG. 17, the probe support 460 has a different shape than the probe support 260, but rather is substantially similar to the probe support 360, shown and described in FIGS. 13-14. Probe support 460 is configured to releasably retain a probe 480 in probe holder 464 and a wire 482 of probe 480 can be wrapped around the probe wrap surface 463.

The presently disclosed invention can additionally or alternatively include one or more of the features described in the related U.S. provisional patent application No. 62/075, 219, entitled "System and Method for Monitoring a Temperature-Related Condition of a Food Item," filed on Nov. 4, 2014, and in the related U.S. patent application entitled "System and method for Monitoring a Temperature-Related Condition, filed on herewith date, which are hereby incorporated by reference in their entirety.

As may be recognized by those of ordinary skill in the pertinent art based on the teachings herein, numerous changes and modifications may be made to the above-described and other embodiments of the present invention without departing from its scope as defined in the appended claims. Accordingly, it is to be understood that this detailed description is to be taken as illustrative and not to be limited to the specific embodiments disclosed and that modifications and other embodiments are intended to be included within the scope of the appended claims. It should be understood that although certain features are described in the embodiments in combination with certain other features, that the invention is not limited to such combinations, and the invention contemplates and covers the features described herein in any and all possible combinations. Further, although specific terms are employed herein, they are used in a generic and descriptive sense only and not for purposes of limitation. Accordingly, this detailed description of embodiments is to be taken in an illustrative as opposed to a limiting sense.

What is claimed is:

1. A temperature monitoring system for monitoring a temperature of a food item, the temperature monitoring system comprising:
   a base comprising a top surface and a bottom surface, the top surface being angled relative to the bottom surface, the top surface having a recess and at least one protrusion in the recess, and the bottom surface including a mounting portion configured for mounting or placing the base onto a mounting surface; and
   a first unit comprising a bottom portion, a display surface further comprising at least one indicator, and a side surface which extends between the bottom portion and the top surface, the side surface further comprising a port for electrically engaging a thermal probe;
   wherein the bottom portion further comprises at least two indents each shaped to correspond to the at least one protrusion, and the bottom portion is removably engageable with the top surface of the base so that the first unit is removably engageable with the base in at least a first orientation and a second orientation relative to the base.

2. The temperature monitoring system of claim 1, wherein the second orientation is 180 degrees rotated from the first orientation.

3. The temperature monitoring system of claim 2, wherein the bottom portion is removably engageable with the top surface of the base by one or more of a snap-fitting, a magnetic attachment, a threaded engagement, a friction fitting, or a twist-lock mechanism.

4. The temperature monitoring system of claim 3, further comprising a probe support configured to releasably retain a thermal probe.

5. The temperature monitoring system of claim 4, wherein the probe support is configured to releasably attach to the base.

6. The temperature monitoring system of claim 5, further comprising a second probe support, wherein the first and second probe support each comprise a recess in the bottom and a corresponding protrusion on top, and wherein the first probe support is stacked with the second probe support.

7. The temperature monitoring system of claim 1, further comprising a thermal probe configured to monitor the temperature of a food item and to communicate the temperature of the food item to the first unit, through the port.

8. The temperature monitoring system of claim 7, wherein the indicator is an LED light ring that indicates information about the temperature of a food item measured by the probe.

9. The temperature monitoring system of claim 8, further comprising a second indicator that is configured to indicate when the first unit is connected to another device via wireless communications.

10. The temperature monitoring system of claim 9, wherein the top surface of the first unit further comprises at least one display, and the display is configured to display numerical temperatures of a food item that is being monitored.

11. The temperature monitoring system of claim 7, wherein the indicator is configured to indicate the closeness of a measured temperature to a desired or predetermined temperature by illuminating different colors.

12. A system for viewing the temperature of a food item, comprising:
a base comprising a top surface having a recess and a bottom surface, and the recess having at least one protrusion;
a first unit comprising a bottom portion, a side surface, and a display surface;
wherein the display surface further comprises at least one indicator;
wherein the side surface further comprises at least one port for engaging a temperature probe; and
wherein the bottom portion comprises at least two indents each shaped to correspond to the protrusion, and the bottom portion is removably engageable by snap or friction fit with the top surface of the base so that the first unit is removably engageable with the base in at least a first orientation and a second orientation relative to the base.

13. The system for viewing the temperature of a food item of claim 12, wherein the top surface of the base is angled relative to the bottom surface of the base and wherein, when the first unit is engaged with the base in the at least first orientation and second orientation, the display surface is angled relative to a surface on which the base is mounted.

14. The system for viewing the temperature of a food item of claim 13, wherein the first orientation is rotated 180 degrees from the second orientation.

15. The system for viewing the temperature of a food item of claim 14, wherein the indicator is an LED light configured to display one or more of a color indicative of a measured temperature, or a color indicative of a temperature relative to a pre-set reference or target temperature.

16. The system for viewing the temperature of a food item of claim 15, wherein the display surface further includes a display configured to display numerical temperatures of a food item that is being monitored.

17. The system for viewing the temperature of a food item of claim 16, further comprising a probe support configured to releasably attach to the base and configured to releasably retain thereon a thermal probe configured to measure a temperature of the item and to communicate the measured temperature to the first unit.

18. The system for viewing the temperature of a food item of claim 17, wherein the probe support comprises a top portion including a first engagement part, and wherein the first engagement part is configured to releasably engage with the bottom surface of the base.

19. The system for viewing the temperature of a food item of claim 14, wherein the indicator is an LED configured to flash different colors, with each color associated with a range or temperature relative to a desired or predetermined temperature.

* * * * *